United States Patent [19]

Duchon et al.

[11] Patent Number: 5,773,813
[45] Date of Patent: Jun. 30, 1998

[54] ANGULAR POSITION FINDING SYSTEM FOR AN OBSERVATION INSTRUMENT

[75] Inventors: Paul Duchon, Venerque; Georges Otrio, Auzielle, both of France

[73] Assignee: Centre National d'Etudes Spatiales, Paris, France

[21] Appl. No.: 652,550

[22] PCT Filed: Dec. 9, 1994

[86] PCT No.: PCT/FR94/01441

§ 371 Date: Aug. 1, 1996

§ 102(e) Date: Aug. 1, 1996

[87] PCT Pub. No.: WO95/16219

PCT Pub. Date: Jun. 15, 1995

[30]     Foreign Application Priority Data

Dec. 10, 1993 [FR] France .................................. 93 14872

[51] Int. Cl.⁶ .................................................. H01J 40/14
[52] U.S. Cl. .................................. 250/206.2; 250/203.2; 244/3.18; 356/139.01
[58] Field of Search .......................... 250/203.7, 203.6, 250/203.1, 203.5, 206.1, 206.2, 203.2; 244/3.16–3.18; 359/209–212; 356/139.01, 148

[56]     References Cited

U.S. PATENT DOCUMENTS

| 4,173,414 | 11/1979 | Vauchy et al. ........................ 356/149 |
| 4,349,838 | 9/1982 | Daniel ................................. 250/203.5 |
| 4,740,682 | 4/1988 | Frankel ............................... 250/203.1 |

*Primary Examiner*—Que Le
*Attorney, Agent, or Firm*—Oblon, Spivak, McClelland, Maier & Neustadt, P.C.

[57]     ABSTRACT

Angular position finding system for an observation instrument, possibly fitted with a sighting change mirror and which includes one or two reflecting mirrors and one or two alignment sensors. Light patterns are produced both on the instrument and on the alignment sensor and are reflected by the mirror to the alignment sensor where their positions are detected. The orientation of the mirror, and indirectly the orientation of the instrument, can be deducted. Furthermore, if the alignment sensor is equipped with a device for determining an absolute orientation reference, the orientation of the instrument with respect to this reference may also be known.

18 Claims, 7 Drawing Sheets

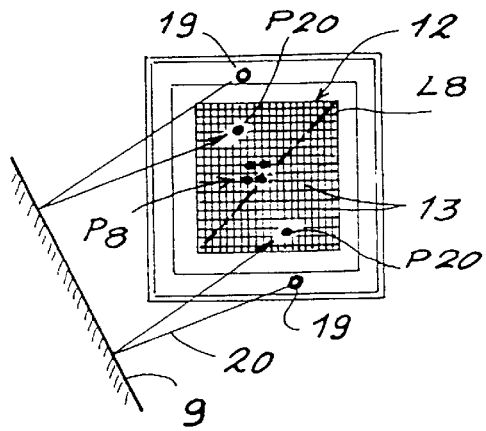
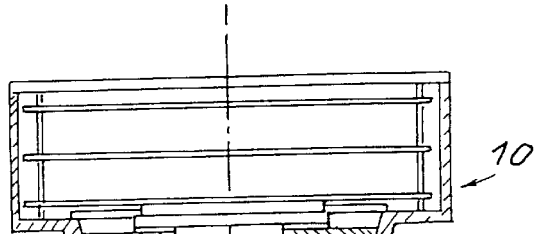
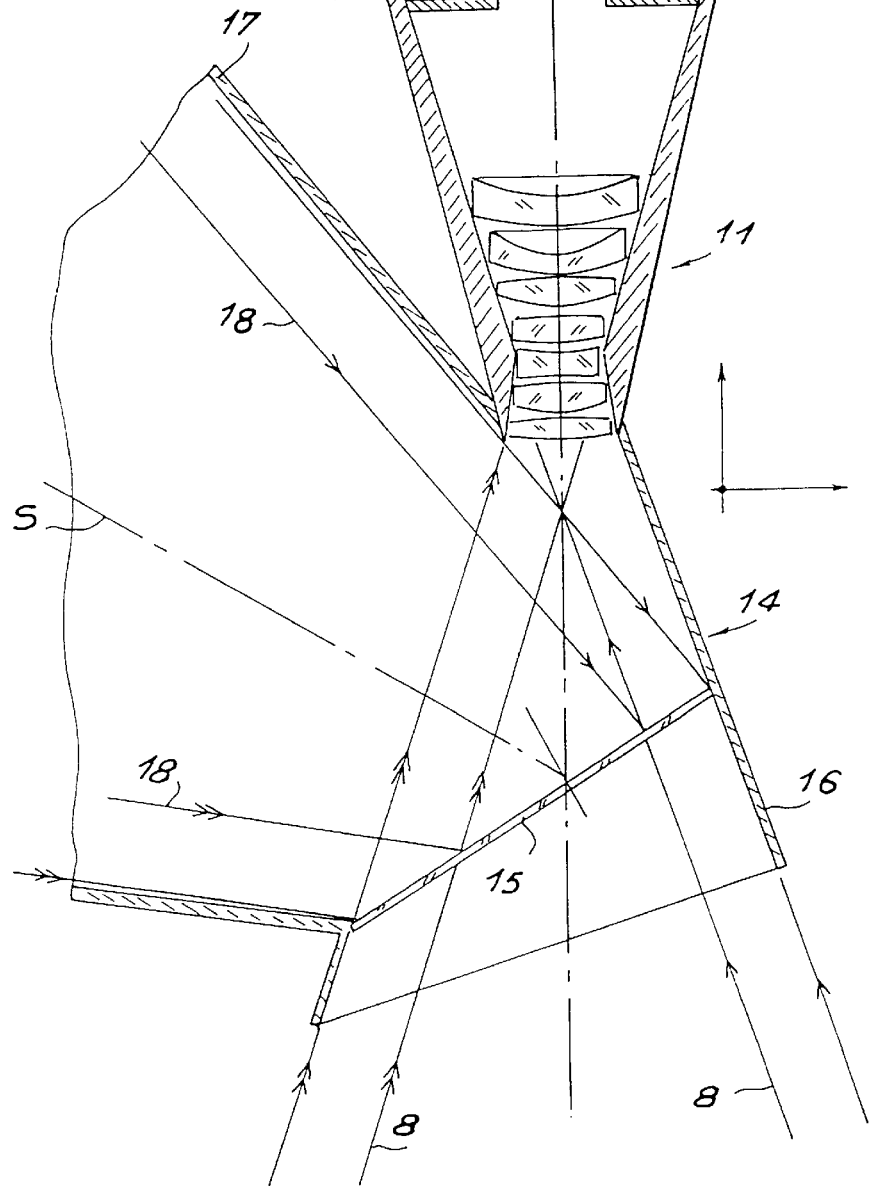

ANGULAR POSITION FINDING SYSTEM FOR AN OBSERVATION INSTRUMENT

BACKGROUND OF THE INVENTION

1. Field of the Invention

The invention concerns an angular position finding system for an observation instrument, and in particular may be incorporated into an artificial satellite, a space vehicle or a space station.

2. Description of the Background

In particular, observation instruments may need to take pictures that have to be located with very high precision. The position and orientation of the instrument on the element that acts as a support are frequently not known sufficiently precisely. Furthermore, it is often necessary or useful to provide sighting change systems, in other words instruments that modify the orientation of the line of sight of the observation instrument. These instruments are required whenever it is disadvantageous or impossible to rotate the entire instrument support machinery, or when it is impossible to wait until the instrument has reached its required orientation by natural means, which occurs periodically on unstabilized satellites. Sighting change equipment acts on the observation instrument either by displacing the instrument itself, or by moving its line of sight (this solution is frequently used on satellites). The instrument then consists of a rotating mirror.

Any sighting change equipment introduces an additional uncertainty in the orientation of the line of sight, due to uncertainty about its mounting position or about the precision of its control, which for example can produce an uncertainty in the orientation of the sighting change mirrors. Finally, expansions caused by temperature changes can deform instrument support structures, particularly on satellites exposed to very large temperature differences between the surface illuminated by the sun and the surface in the shade.

All these circumstances explain why it is impossible to adjust the line of sight of observation instruments with a precision better than about two hundred seconds of arc, which corresponds to a positioning uncertainty of eight hundred meters on the ground for a satellite at an altitude of eight hundred kilometers, although the satellite itself can be located within a few tens of meters. This difference shows that improving the location of a view on the ground depends above all on the quality of orientation of the instrument or its line of sight.

SUMMARY OF THE INVENTION

This invention is designed specifically to eliminate this problem of directional inaccuracy by means of a system which, in its most general form, includes a first light pattern source rigidly attached to the instrument close to the focal plane of the instrument and consisting of at least two dots; a light sensor fixed at a know direction on the space vessel to which the instrument and the system are fixed; and a reflection mirror positioned to reflect light from the source to the sensor the mirror being rigidly attached either to the sensor or to the sighting change mirror (if there is one).

The position of the image of the light pattern on the sensor expresses the instrument orientation. If the system does not include any other particular elements, the orientation of the reflecting mirror (which must not be confused with the sighting change mirror) must be accurately known, which for example is possible if it is mounted carefully on a support rigidly attached to the sensor.

In particular, the light sensor may consist of a star sensor which is fairly frequently used in satellites. It then provides its own directional reference by detecting the image of reference stars at the same time as it detects the image of the light pattern, and compares the position of the two images on its screen. The directional reference may also be completed by a gyroscopic assembly, which is then rigidly attached to the light sensor.

Other uncertainties can arise if the direction of the reflecting mirror is not known accurately. This is why it may be necessary to use a second source rigidly attached to the light sensor and which outputs a second light pattern, the light from which is returned by the reflecting mirror to the sensor, and the position of the image of this second pattern is added to the sensor direction reference and to the position of the pattern emitted by the instrument to give the direction of the instrument with an accuracy which is no longer affected by uncertainties in detection resolution and the direction in which light patterns are projected, that can easily be reduced to a very low level.

The invention may be used with some complementary improvements in its preferred methods of embodiment. Firstly, the reflecting mirror may form an angle and include two plane facets separated by an edge, with one facet reflecting light from the first source and the other facet reflecting light from the second source, so that the position of the sensor with respect to the instrument is unimportant. If there is a sighting change mirror and if the reflecting mirror is fixed, the reflecting mirror may include a facet elongated perpendicularly to the axis of rotation of the sighting change mirror and that reflects the light pattern from the first source to one of the sides of the axis of rotation of the sighting change mirror along which the light sensor lies. With this arrangement, the sensor is located at the side of the instrument sighting trajectory and therefore does not intercept it, and the light sensor is useful for a long angular movement of the sighting change mirror.

BRIEF DESCRIPTION OF THE DRAWINGS

The invention will now be described in relation to these and other objects and characteristics, with reference to the following appended figures provided for illustrative purposes, without being restrictive:

FIG. 2 shows installation of the light sensor, FIG. 2a shows the formation of images on the light sensor screen.

DESCRIPTION OF THE PREFERRED EMBODIMENTS

Figure 1:
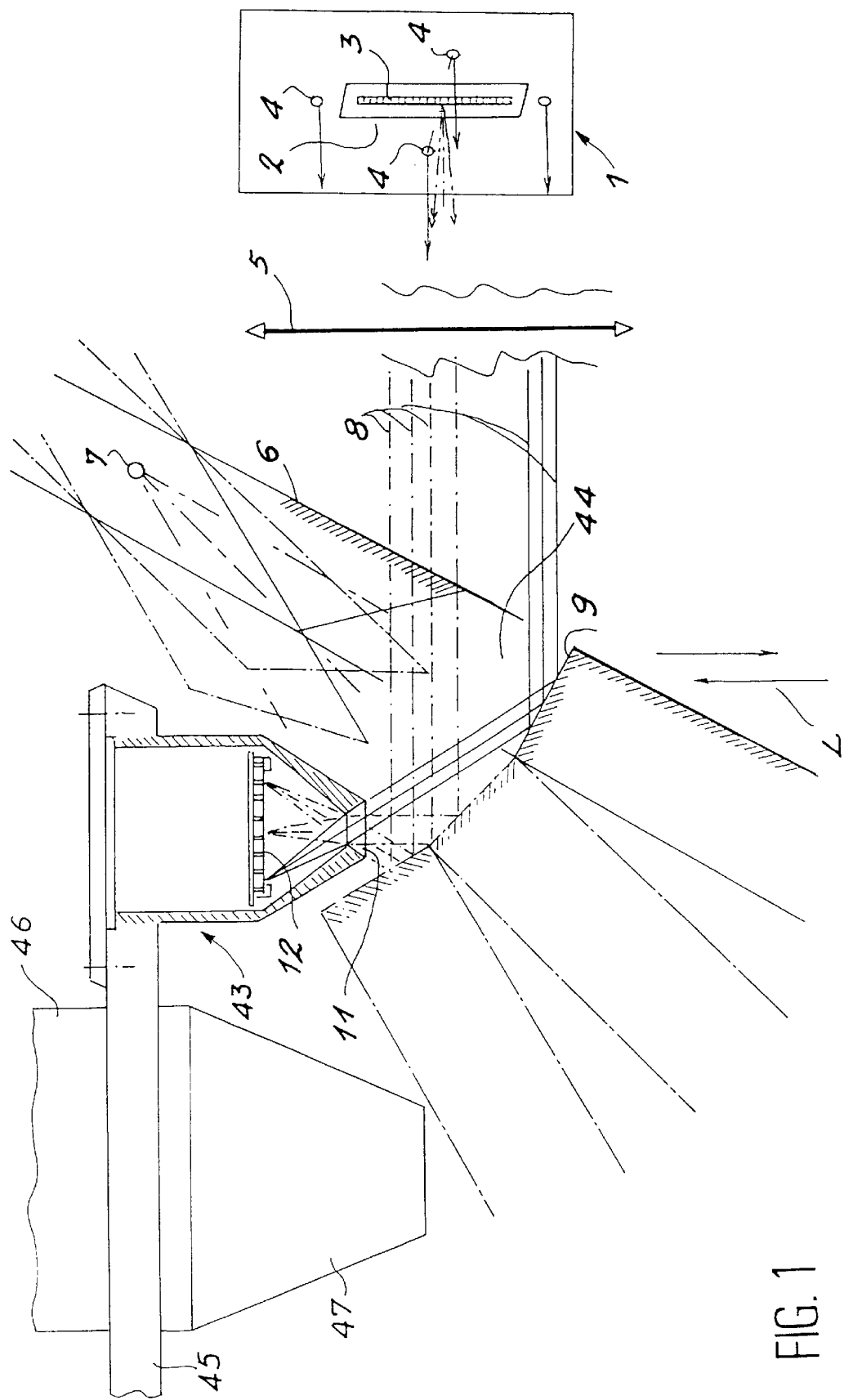
FIG. 1 shows some essential elements of a first embodiment of the system according to the invention, FIG. 1a schematically shows the light sensor screen.

In the embodiments which will be described, elements according to the invention are assumed to be installed on an artificial satellite. We will firstly look at FIGS. 1 and 1a. The observation instrument 1 is fixed on the satellite and is shown partially, and in particular has an apparent surface 2 which coincides with its focal plane and is fitted with an observation sensor module 3 and four light emitting diodes 4 flush with its surface (two light sources may be sufficient, as we will see later), each emitting a laser light beam that can be recognized by the light sensors. Two of the four diodes 4 are placed at the ends of the sensor module 3, and the other two are placed on its sides at mid-distance from the first two. It is advantageous to only use one emitting laser-diode 4 (shown on FIG. 1b) in front of a divergent beam of optical fibers 41, each of which captures part of its light and leads to the same emission points, at ends 42, such that the effect is the same.

An optical system 5 is placed in front of the observation instrument 1. It is symbolized in the form of a focusing lens, but may be of any known type depending on the needs and properties of instrument 1. One of its effects is to defocus the rays output from diodes 4 to spread their light according to rays 8 occupying a front with a wide surface.

Figure 1A:
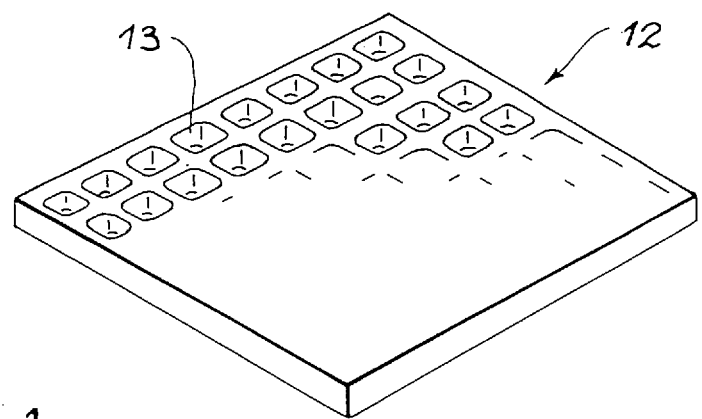
FIG. 1b represents a change to a detail in the first embodiment.
Figure 1B:
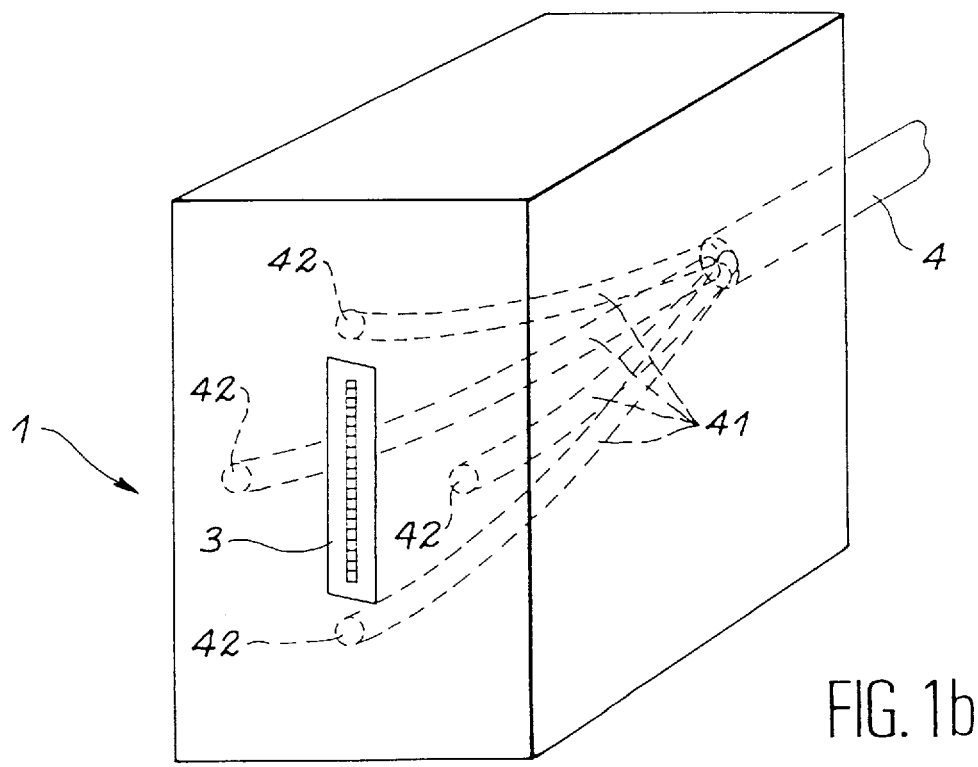

A sighting change mirror 6 is placed in front of the optical system 5. This mirror rotates about an axis of rotation 7 and its total movement may be, for example, 30°. Light rays originating from the observation point moving along a line of sight L reach the instrument 1 after being reflected by the sighting change mirror 6. Rays 8 are not necessarily reflected on the sighting change mirror 6, since they pass through a hole 44 formed through it, or at the side of it. They are only reflected by a second mirror, called the reflection mirror 9, which is rigidly attached to the sighting change mirror 6 and which is fixed on one side of hole 44. They reach a light sensor called alignment sensor 43 preceded by an optical system 11 capable of converging beams 8 onto a sensitive surface 12 on the alignment sensor 10 formed of a rectangle, in this case a square, of detectors 13 (FIG. 1a). A computer (not shown) built into the alignment sensor 43 breaks down the image recorded globally by detectors 13 to deduce the global direction of the satellite, to which the alignment sensor 43 is assumed to be fixed at a perfectly known direction. It is fixed to a plate 45 connected to the satellite, to which a star sensor (stellar sensor) 46 and a gyroscope 47 are also attached, and which output a direction reference in a fixed coordinate system. This image analysis does not cause any particular problems, since it is always possible to choose different wavelengths for light from diodes 4 (for example 0.95 microns) and light corresponding to the wavelengths detected in instrument 1 (from about 0.4 to 0.9 microns, and from about 1 to 2 microns) if no other information, such as the position or extent of respective images, is available.

Sufficient information is always produced if each image comprises two points, since a single point is not sufficient to detect all element rotations which are responsible for its position on the sensitive surface 12. Therefore, in principle, light patterns forming images are formed from a minimum of two points, and, in practice, it is often preferred to have more: this is why the described solution uses four diodes 4.

Defocusing light from diodes 4 means that the reflecting mirror 9 remains within the front of rays 8 for all rotations of the sighting change mirror 6.

FIGS. 2 and 2a provide information about making a sophisticated alignment sensor 10 which can simultaneously act as a star sensor, but some of this information may also be applicable to the previous alignment sensor 43. A screen 14 is placed in front of the optics 11 of the alignment sensor 10 to blank off parasite light. A half-mirror 15 is recessed in screen 14 which consists of two horns, one of which 16 supporting half-mirror 15 lies along an extension of the optical axis of the alignment sensor 10, and the other 17 is connected to the first and is located in front of the half-mirror 15. The half-mirror 15 is used so that the alignment sensor 10 collects light forming images from two different directions. More precisely, it is transparent to the wavelength of rays 8 from diodes 4 which pass through it, therefore passing through horn 16, but it reflects the wavelengths from detected stars, the rays 18 of which therefore pass through the other horn 17 to reach the alignment sensor 10. This other horn may be equipped with a diode 4 wavelength filter, to immediately make a distinction between the images mentioned above. Therefore, the half-mirror 15 acts as a filter for each measurement direction, and makes it possible to distinguish between images of stars and diodes 4 on the sensitive surface 12 based on their colors, and with no possibility of error.

Figure 3:
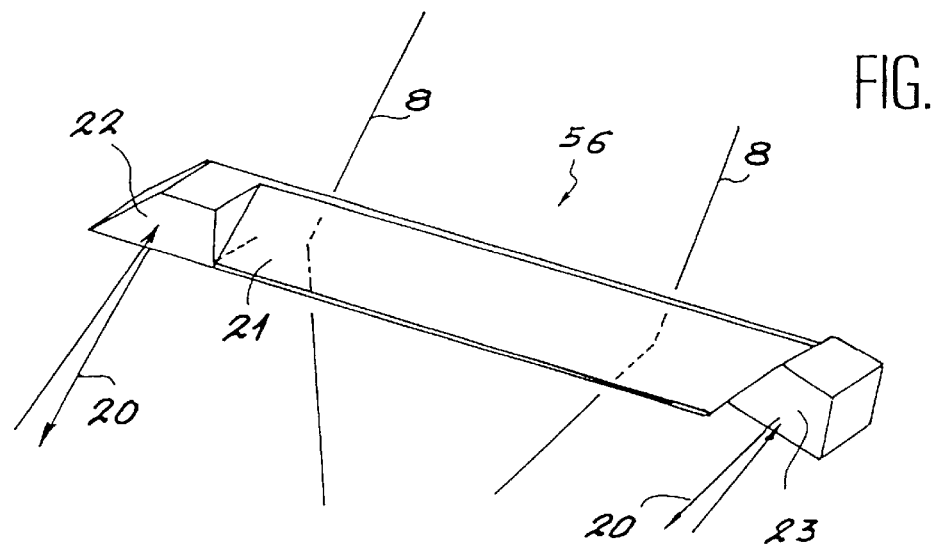
FIG. 3 represents a reflecting mirror.

A very advantageous embodiment of the invention will now be described with reference to FIGS. 3, 4a and 4b. It illustrates the specific embodiment of some of the above reasoning. The description of FIG. 1 remains applicable concerning the observation instrument 1, the sighting change mirror 6 and connected parts. But the system as described so far is not necessarily sufficient since rotations of the reflecting mirror 9 about an axis perpendicular to its reflection plane are not detected by alignment sensor 10. The alignment sensor 10 is fitted with two additional light emitting diodes 19 (FIG. 2a) at the edges of the square of detectors 13, and the rays 20 of which are directed towards the reflecting mirror 9 and are then reflected by it and return almost to their starting point, on the square of detectors 13. The image of this light pattern supplies the orientation of reflecting mirror 9 by its position on the sensor square 13. It consists of two points P20 that can easily be distinguished from the light pattern P8 produced by the rays 8 originating from diodes 4 located on instrument 1 and which is formed of four points, even if the light is of the same wave length, since they are located on different areas of the sensitive surface 12: the light pattern P8 moves along a line L8 depending on the rotation of the sighting change mirror 6, the line possibly being a diagonal of the square of detectors 13, and points P20 are away from it.

The reflecting mirror 56 for this embodiment is complex and is formed of three different facets, one of which denoted 21 is an oblique sheet at 45° and is designed to reflect rays 8 at a right angle. The other two facets 22 and 23 are located approximately perpendicularly to the axis of rotation 7 (at an angle which can however vary between about 60° and 120° in practice), at the ends of the previous facet 21, and which return rays 20 from diodes 19 to the star sensors and alignment sensors 10a or 10b, of which there are two in this embodiment for reasons which will be explained.

When the sighting change mirror 6 rotates, plots of the reflection of rays 8 intercepted by the optics of sensors 10a or 10b move over the entire length of facet 21 which must have the consequent extension. Light plots formed by them on the square of detectors 13 also move, and the problem then occurs that easily available sensitive surfaces 12 are fairly small compared with typical movements of the sighting change mirrors 6. This problem is less severe if steps are taken to set out the square of detectors 13 such that the light traces pass approximately from end to end of a diagonal, in other words along line L8 in FIG. 2a.

Figure 4A:
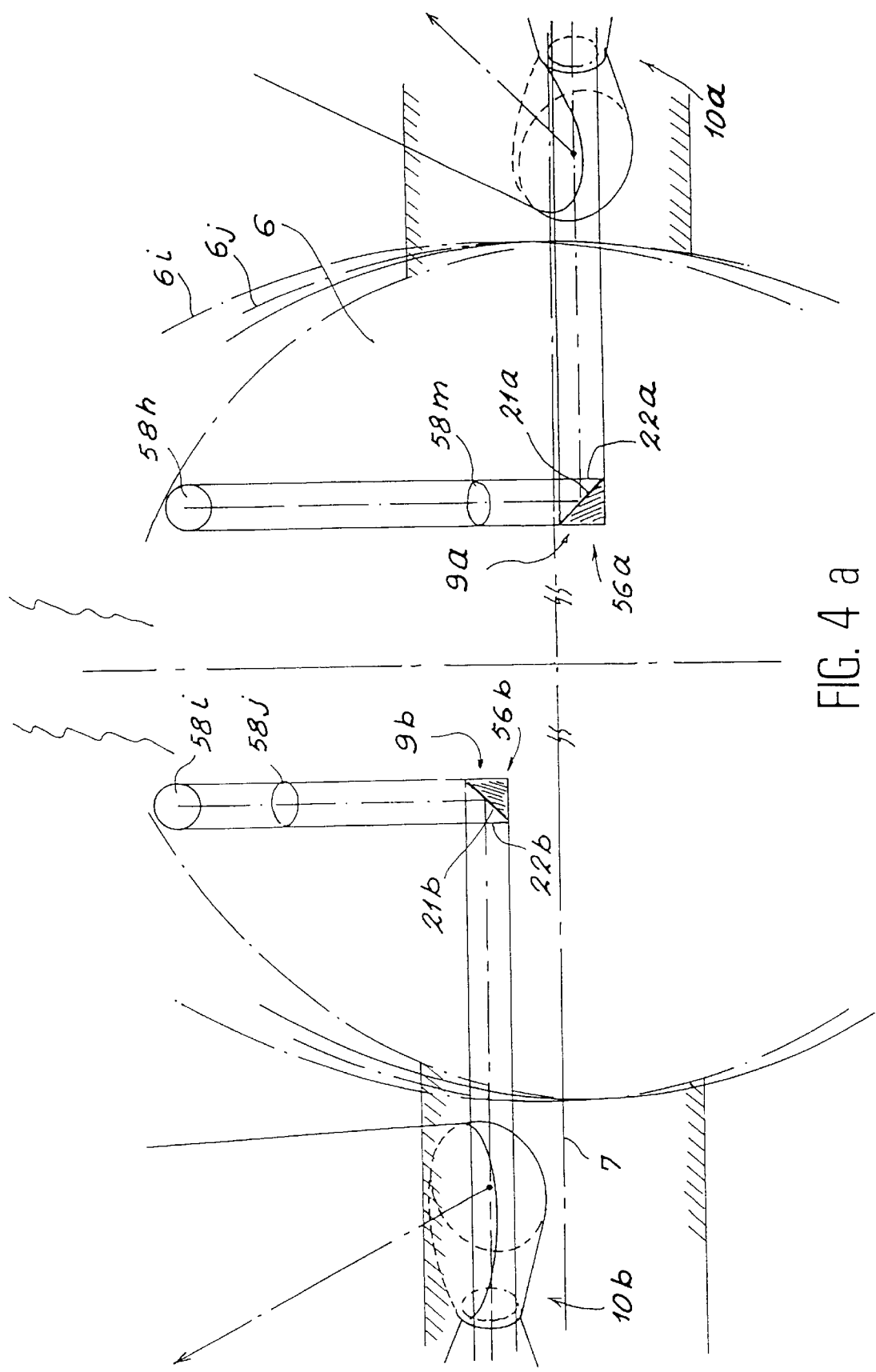
FIGS. 4a and 4b show details of another complete embodiment of the invention, and in particular show reflecting mirrors according to FIG. 3.
Figure 4:
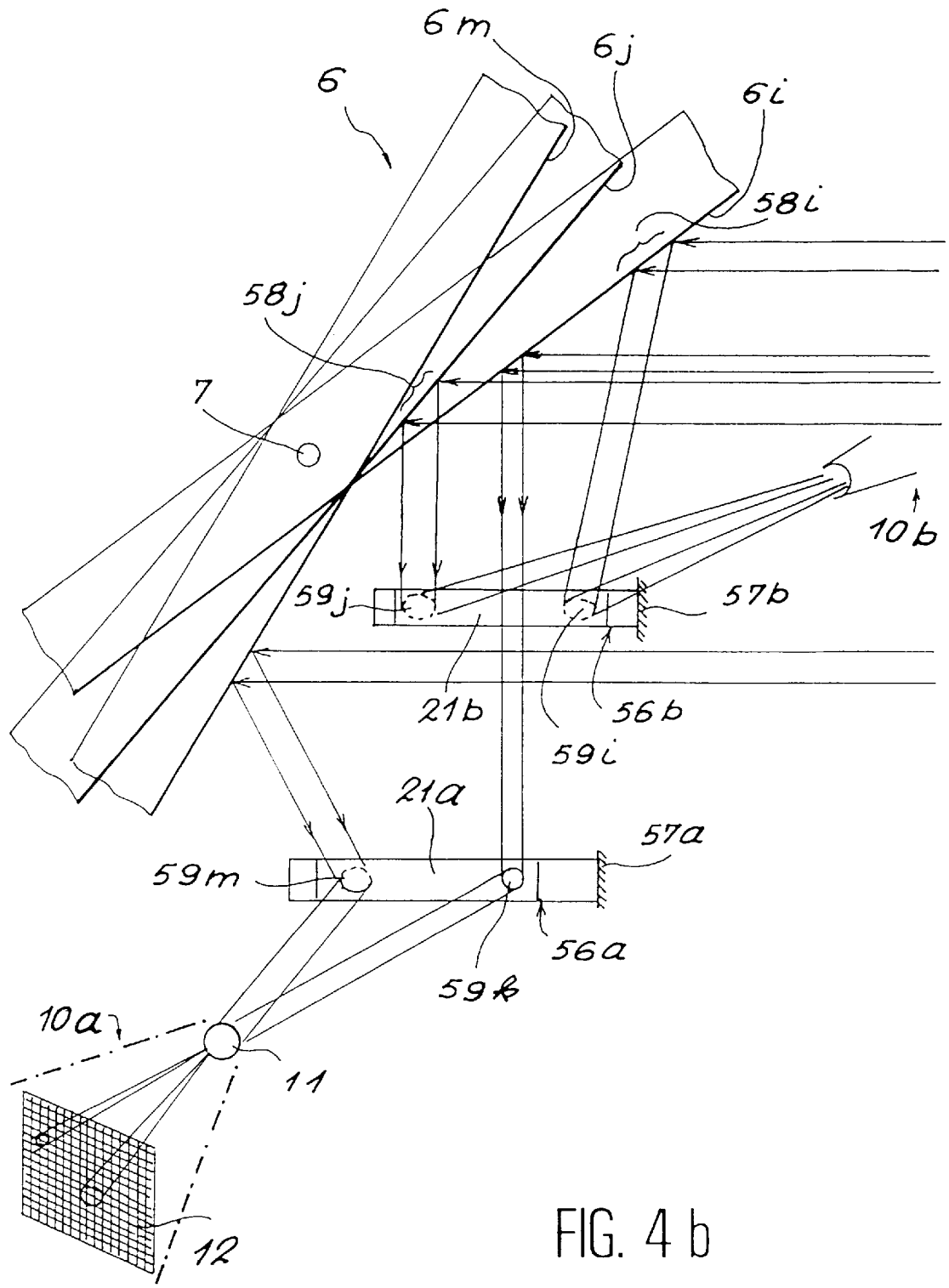

Another method of making large movements for the sighting change mirror 6 compatible with the invention consists of duplicating the position finding system: this solution is shown here, and is clearly visible on FIGS. 4a and 4b, on which there are two different reflecting mirrors 56a and 56b which reflect rays 8 in lateral and opposite directions parallel to the axis of rotation 7, to two alignment sensors 10a and 10b approximately facing each other.

In this embodiment, reflecting mirrors 56a and 56b are independent of the sighting change mirror 6 and are related to the satellite body through support surfaces 57a and 57b; they are parallel and slightly offset in front of the sighting change mirror 6, in the transverse direction so that the rays 20 that they return to alignment sensors 10a and 10b are not intercepted by the other reflecting mirror 56, and in the longitudinal direction to cover the entire angular movement of the sighting change mirror 6. More precisely, in an extreme angular position of the sighting change mirror, denoted 6i, a portion of the rays 8 occupying a beam 8i, is reflected on the sighting change mirror 6 to form a light spot 58i, and is reflected on the reflecting mirror 56b to form a light spot 59i close to support surface 57b; the corresponding rays 8 are returned to the alignment sensor 10b to form the diode image 4. When the sighting change mirror 6 rotates, light spots 58 and 59 produced by reflections of the useful part of the front of rays 8, move on the ray and on the elongated facet 21b, for finally obtaining a situation in which they occupy positions 58j and 59j (59j being close to the end of the elongated facet 21b opposite support face 57b), the position of the sighting change mirror 6 being denoted 6j and being located at the middle of the angular movement. Obviously, rays 8 concerned are not the same as the rays described above, but they are just as capable of forming the image of diodes 4 on the sensitive surface 12 on the alignment sensor 10b. Furthermore, other rays 8 simultaneously form spots 58k and 59k on the sighting change mirror 6 and one end of the elongated facet 21a of the other reflecting mirror 55a, which starts to be useful and to form an image of diodes 4 on the corresponding alignment sensor 10a.

In order to understand how the optical system works, it is essential to realize that rays 8 are reflected at all times on the entire elongated facet 21a or 21b, but rays that are outside the light spot 59 are returned at the side of alignment sensor 10 and are therefore lost, as a function of the oblique angle applied to them by the angular position of the sighting change mirror 6 and which appears in the form of a variable component, to the left as shown on FIG. 4b (vertically beyond spot 58 and horizontally beyond spot 59).

When the rotation of the sighting change mirror 6 is continued to the other end of its movement at the position denoted 6m, the light spots move towards positions 58m and 59m, 59m being at the other end of the elongated facet 21a, and rays 8 no longer reach the other reflecting mirror 55b.

The fact that light from diodes 4 passes along the path in the opposite direction to the light from observation instrument 1 (from the focal plane of the instrument containing diodes 4, to the sighting change mirror 6) guarantees the performance of the invention.

In a specific example, the sighting change mirror 6 has a total angular movement of 30°, such that the line of sight L can be moved by 60°, which is close to the maximum of known satellite embodiments. The sensitive area 12 will be selected to be a square of detectors 13 with 1024 image points along each side for an angle of vision of 26°, which means that the angle of vision is $\sqrt{2.26}$°, namely about 37° along a diagonal (line L8). Facet 21 is inclined of 45° on the axis of rotation 7, but this is not essential, nor necessarily s the optimum. The sensitive surface 22 detects stars between orders of magnitude of about −2.5 and +4.5, such that it is always possible to locate at least one. Furthermore, there is an angle of about 60° between the lines of sight of stars (S on FIG. 2, corresponding to the axis of the horn 17), and alignment sensors 10 (which could advantageously be close to 90°, and which should be at least 45°), in order to be able to deduce the satellite orientation with optimum precision using two alignment sensors 10 together, which is possible since each of them can always see one star.

If the side of the square of detectors 13 is 19.5 mm, or if the side of each image dot is 1.9 microns, light dots P20 and dots in pattern P8 appear in the form of spots which extend over two, three or four image dots due to defocusing, aberration and diffraction. The optical system 11 is not designed to focus rays 8 perfectly, but rather to form small separate light spots, each of which corresponds to the light from one of the diodes 4. The center of gravity method used to estimate the position of the spots, used on stellar sensors, is then used for each light spot (originating from diodes 4, 19 and detected stars) to calculate the center of the spot, equivalent to the projection of the associated light source assumed to be a point. It is repeated on the centers of light spots from diodes 4 to calculate the orientation of observation instrument 1. This state of the art method is implemented by the computer using the alignment sensor 10, and in nine cases out of ten gives an uncertainty of less than 10 seconds of arc for the direction of the line of sight.

This corresponds to an uncertainty of positioning on the ground equal to 40 m for a satellite at an altitude of 800 km. If the uncertainty of the satellite position is 25 m, the quadratically accumulated uncertainty is about 50 m, which should be compared with the value of 800 m found under the same conditions if the invention is not used.

Figure 5:
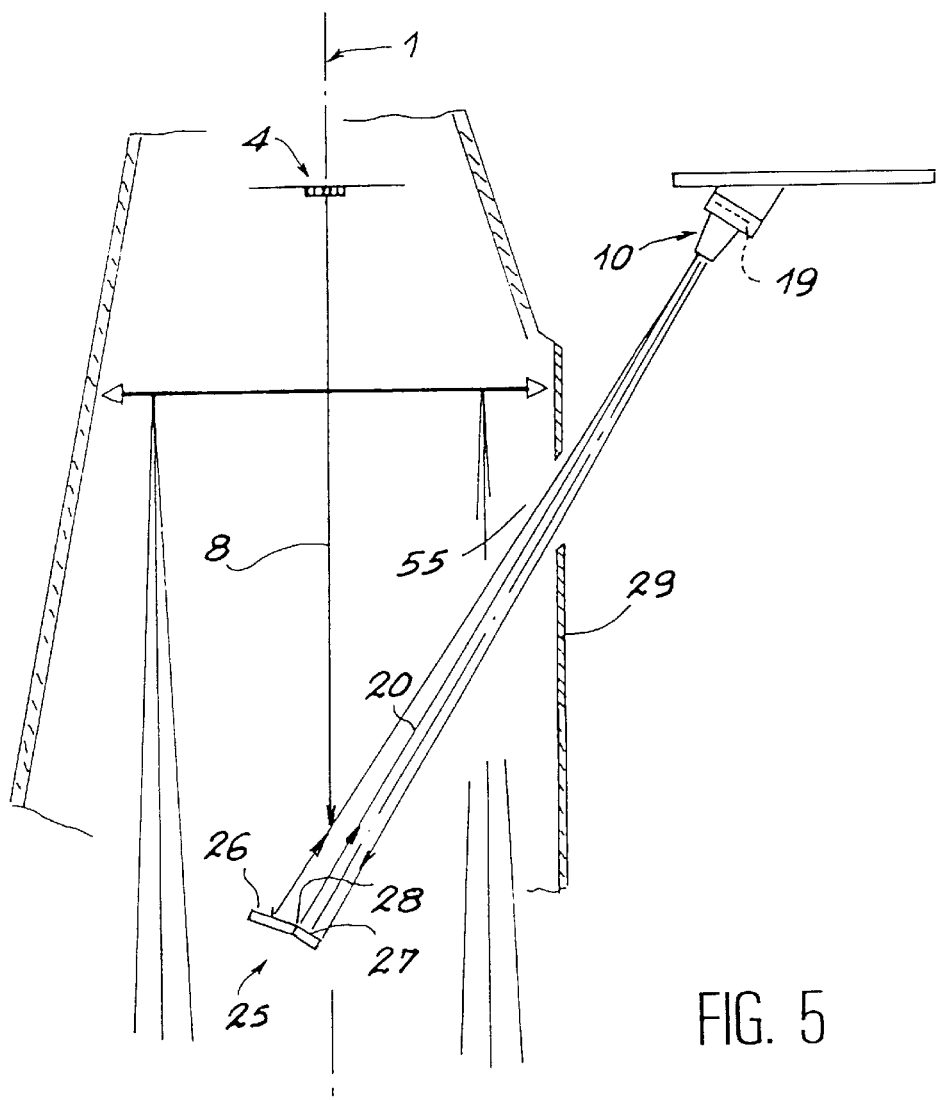
FIG. 5 shows another way of making the invention, with a different reflecting mirror.

Other systems could be designed for the invention. Thus the reflecting mirror could be smaller if the instrument is used without the sighting change mirror. It is referenced by 25 in an embodiment of this type drawn in FIG. 5, and consists of two facets 26 and 27 limited by an edge 28, the first of which is designed to reflect rays 8 from diodes 4 on instrument 1 to alignment sensor 10 (with low field of vision unlike the corresponding solution with the sighting change mirror), and the second part of which is used to reflect rays 20 from diodes 19 in the alignment sensor 10. Reference 29 indicates to a single screen that limits the field of vision of the instrument and the parasite radiation that it receives. Rays 8 reflected by mirror 25, and rays 20 pass through a hole 55 which is formed in it. As before, the direction of instrument 1 is estimated by measuring the positions of the spots corresponding to the different diodes 4 and 19 on the sensitive surface of the alignment sensor 10, and correlating them to the direction of the alignment sensor 10, deduced from a stellar reference or another reference, or known in advance. Once again, diodes 19 and facet 27 may be omitted if the orientation of the reflection mirror 25 is well known.

These positions are even more precise, since under the same conditions as in the previous embodiment, and particularly with the same alignment sensor 10, the uncertainty of the orientation of the line of sight is now only 3" of arc. We can immediately deduce that the uncertainty of positioning on the ground is 12 m (due to the alignment error only) for a satellite at 800 km, and 30 m (by quadratic accumulation), allowing for an additional satellite positioning uncertainty of 25 m.

Figure 6:
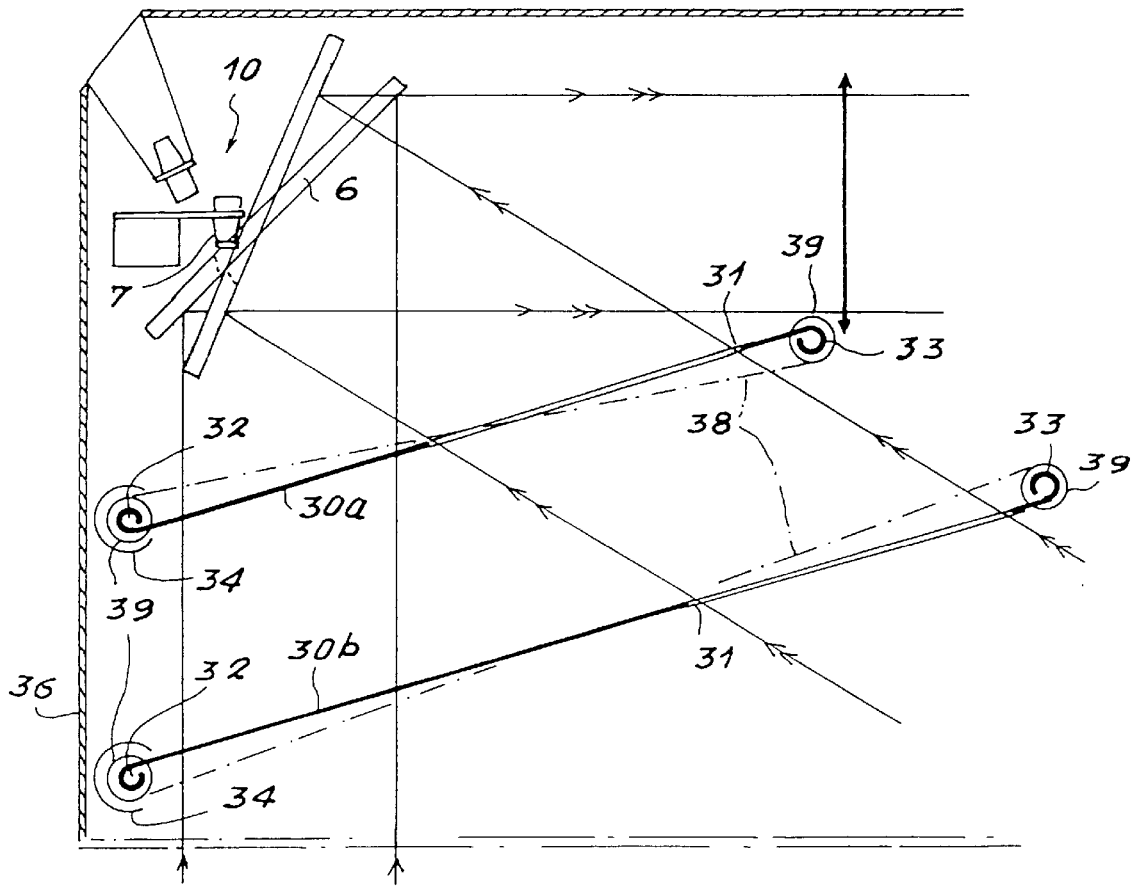
FIGS. 6 and 7 illustrate a mobile screen used in relation to the invention.
Figure 7:
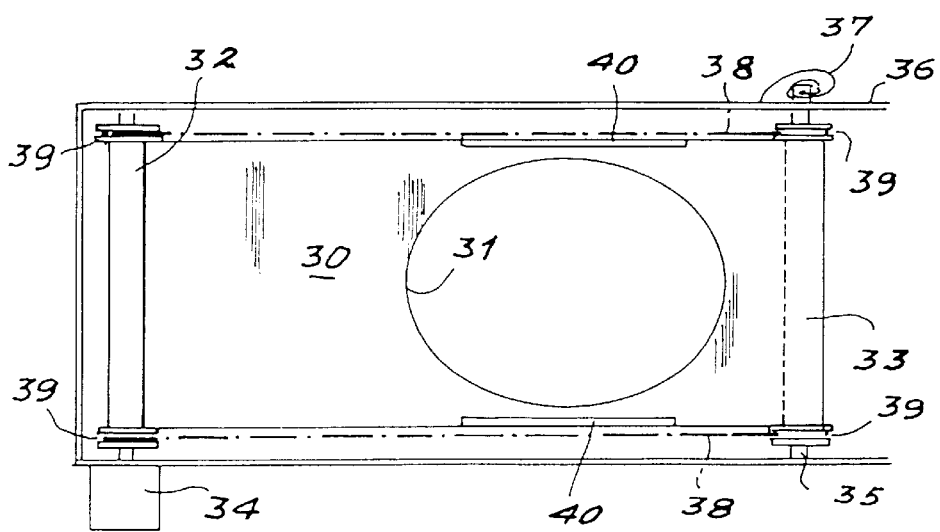

We will now describe another aspect of the invention. This is a system of mobile screens for an optical observation instrument with a sighting change mirror. FIG. 6 illustrates it in a construction using two of these screens 30a and 30b, which consist of a membrane in which a hole 31 has been cut out. The shape of the holes 31, elliptical in this case, and their surface area are adapted to the width of the field of vision of instrument 1. Since the screens are placed in front of the sighting change mirror 6, they should be moved to correspond with it, and keep holes 31 on the sighting field. Consequently, the membrane of each screen 30 extends between two rollers 32 and 33, around which its ends are wound and at least one of which is driven by a motor 34 and the other may be driven in a similar way by another motor to form a redundant system.

Rollers 32 and 33 are connected to spindles 35 rotating in a support frame 36 (which also supports alignment sensor 10 and the hinge pin 7 of the sighting change mirror 6), and a spring 37 applies a force along one of the spindles 35 in a direction of rotation which always tends to tension screen 30. Spring 37 may be helical or spiral and its stiffness is sufficiently small so that it exerts a force which does not vary much with rotations of the roller 33 on which it acts. If a motor 34 is used on each roller 32 and 33, a spring 37 may also be fitted on each of rollers 32 and 33 in order to control one of motors 34 at a time, and to apply tension along axis 35 which is not controlled.

Cables 38 are tensioned between rollers 32 and 33 parallel to screen 30, and are preferably distributed on both sides of the screen. Their ends are actually wound around pulleys 39, some of which (one per cable 38) are mounted rigidly on axes 35, and the others are mounted slidingly along axes 35 and are acted upon by springs not shown, similar to springs 37, in order to tension cables 38 at the same time as screen 30.

The purpose of cables 38 is to simultaneously drive the two rollers 33 with a single motor 34, and incidentally to provide dynamic compensation for movements of screen 30.

When motor 34 rotates, screen 30 moves in one direction and cables 38 move in the other direction, and this is why they are chosen to have similar linear masses so that movement quantities of screen 30 and cables 38 are balanced; strictly speaking, screen 30 should be ballasted in front of hole 31 by reinforcements 40 to equalize the linear mass.

Note also that the directions of extension of screen 30 and cables 38 are crossed as shown on the view in FIG. 6 (taken in the direction of axes 35). This then cancels out the kinetic moments of rollers 32 and 33, and of pulleys 39 which rotate in opposite directions.

The kinetic moments of the sighting change mirror 6 and its motor (not shown), and of motor 34, may also be canceled out, by applying the principle described in French patent 93. 04953, which demonstrates that it is only necessary to use an appropriate number of gear mechanisms, with suitable tooth ratios and wheel masses.

We claim:

1. Angular position finding system for an observation instrument onboard a space vessel, said instrument including a focal plane and, optionally, an instrument mirror, changing a sighting direction of the instrument, said system comprising:
    a source of a first light pattern located on the observation instrument proximal to said focal plane, and consisting of at least two points of light:
    a light sensor fixed at a predetermined orientation on said space vessel; and
    a reflecting mirror at a constant position with respect to one of said instrument mirror and said light sensor, the reflecting mirror being placed so as to reflect light from said source to said light sensor.

2. Angular position finding system according to claim 1, further including a second light pattern source at a constant position with respect to the light sensor, the reflecting mirror being placed so as to reflect light from the second light pattern source to the light sensor.

3. Angular position finding system according to claim 1, wherein at least the first light pattern is composed of the ends of a divergent beam of illuminated optical fibers.

4. Angular position finding system according to claim 1, wherein the light sensor is used with a star sensor which is rigidly attached thereto.

5. Angular position finding system according to claim 1, wherein the light sensor is capable of detecting stars.

6. Angular position finding system according to claim 5, wherein the light sensor includes a half-mirror reflecting a first category of wavelengths and transparent to a second category of wavelengths, the stars which are detected by the light sensor emitting light of one of the categories and the source emitting light of another one of the categories.

7. Angular position finding system according to claim 2, wherein the reflecting mirror consists of two plane facets forming an angle, and each of which receives one of the light patterns.

8. Angular position finding system according to claim 1, wherein the reflecting mirror is rigidly attached to the sighting change mirror.

9. Angular position finding system according to claim 8, wherein the reflecting mirror is formed on the surface of a hole in the sighting change mirror.

10. Angular position finding system according to claim 2, wherein the instrument mirror is rotatable and the reflecting mirror is fixed on the space vessel and includes at least one facet extending perpendicular to an axis of rotation of the rotatable instrument mirror and reflecting the first light pattern source to one side of the axis of rotation of the instrument mirror, and one facet approximately perpendicular to said axis of rotation and reflecting the second source.

11. Angular position finding system according to claim 1, further including a second reflecting mirror, the two reflecting mirrors being fixed on the space vessel and each consisting of a facet extending perpendicularly to an axis of rotation of the instrument mirror and each reflecting the first light pattern source to one side of the axis of rotation, and a second light sensor fixed predetermined direction on the space vessel, to which the second reflection mirror reflects the first light pattern source, the reflecting mirrors and light sensors being placed so that the light sensors successively receive light from the first light pattern source when the instrument mirror rotates in a rotational span and through an overlap span included in the rotational span, the light sensors both receiving light from the first light pattern source when the instrument mirror rotates in the overlap span.

12. Angular position finding system according to claim 11, wherein the light sensors are star sensors with stellar observation axes that form an angle of at least 45°.

13. Angular position finding system according to claim, 2, wherein the light sensor has a rectangular shaped sensitive area, and the light from the first light pattern source passes along a diagonal of this surface as a function of the rotation of the sighting change mirror.

14. Angular position finding system according to claim 13, wherein the reflecting mirror is oriented so that light from the second source is reflected on the sensitive surface away from the diagonal of the first source.

15. Angular position finding system according to claim 1, wherein the observation instrument with a instrument mirror is used together with a mobile screen with apertures in front of the instrument mirror.

16. Angular position finding system according to claim 15, wherein the mobile screen with apertures is tensioned on two rollers, and cables having a same linear mass as the screen are tensioned on the opposite sides of the rollers.

17. Angular position finding system according to claim 16, wherein the cables and the screen are tensioned in a cross pattern on the rollers.

18. Angular position finding system according to claim 16, wherein the cables are tensioned on the rollers by means of pulleys that rotate around said rollers and are linked to the rollers by springs.

* * * * *